United States Patent [19]

Suzuki

[11] Patent Number: 4,540,924
[45] Date of Patent: Sep. 10, 1985

[54] SYSTEM FOR POSITIONING AN OBJECT AT A PREDETERMINED POINT FOR A DIGITAL SERVO DEVICE

[75] Inventor: Hayao Suzuki, Tokyo, Japan

[73] Assignee: Kabushiki Kaisha Daini Seikosha, Tokyo, Japan

[21] Appl. No.: 463,159

[22] Filed: Feb. 2, 1983

[30] Foreign Application Priority Data

Feb. 5, 1982 [JP] Japan .................................. 57-17722

[51] Int. Cl.³ ............................................ G05B 19/42
[52] U.S. Cl. .................................... 318/568; 318/600; 318/608
[58] Field of Search ............... 318/600, 601, 603, 608, 318/599

[56] References Cited

U.S. PATENT DOCUMENTS

| | | | |
|---|---|---|---|
| 3,175,138 | 3/1965 | Kilroy et al. | 318/608 X |
| 3,401,321 | 9/1968 | Miki | 318/600 X |
| 3,621,357 | 11/1971 | Kubo | 318/600 |
| 3,843,915 | 10/1974 | Helmbold | 318/608 X |
| 4,318,519 | 3/1983 | DuVall | 318/608 |
| 4,319,172 | 3/1982 | Sieradzki | 318/608 |

Primary Examiner—B. Dobeck
Attorney, Agent, or Firm—Robert E. Burns; Emmanuel J. Lobato; Bruce L. Adams

[57] ABSTRACT

A digital servo device having a servomotor with a feedback control device including a position detector. The detector detects the phase relationship among the various signals. The detector is a flip flop located between an AND gate and a differentiation circuit. The flip flop is connected to be set by a predetermined point detecting signal output from the AND gate and the flip flop is connected such that the positive and reverse direction command pulses are inhibited from being produced by locking a receiving shift register in response to an output signal from the flip flop. The feedback circuit is reset by a reset signal which comprises a differentiated output signal of the flip flop which has a pulse width wide enough for obtaining a resetting condition but not so wide that the next positive and reverse direction detecting pulses are extinguished.

3 Claims, 6 Drawing Figures

SYSTEM FOR POSITIONING AN OBJECT AT A PREDETERMINED POINT FOR A DIGITAL SERVO DEVICE

BACKGROUND OF THE INVENTION

The present invention relates generally to a positioning apparatus in a digital servo device, such as a robot having a servomotor, and more particularly, to an apparatus having a feedback control device and a detector for detecting the phase relationship among the signals which are different in phase timing from each other (which will be referred to as A phase and B phase, respectively) by a signal for detecting an original point of the detector itself (referred to as Z phase hereinafter). These two signals of A phase and B phase are related to the amount and the direction of the operation of a mechanical device or a driving device driven by a servomotor or the like. A predetermined phase relationship is provided among the A, B and Z phases (for example, the B phase should be varied only one time during the period the Z phase is output), and the phase relationship is detected by the detector. The positioning system in a digital servo device operates the mechanical device in accordance with the speed of command pulses, the number of the command pluses and an operating direction signal. The above described phase relationship among the Z phase, A phase and B phase is not a unique phase relationship, but the phase relationship is a well-known relationship used in a detector known as an optical-encoder or the like.

An example of the conventional positioning system in a servo device will be described in conjunction with FIG. 1 showing a circuit diagram, FIG. 2 showing a timing chart for an interface circuit in FIG. 1 except for the feedback circuit 4), FIG. 3 showing a positioning command circuit and FIG. 4 showing a timing chart for explaining the operation of positioning an object at a predetermined point.

A clock generator 1 generates two clock signals $C_1$ and $C_2$ alternately and the timing at the active level (equal to the (H) level in this embodiment) of the signal $C_1$ is never coincident with that of the signal $C_2$. Command pulses are applied to a receiving shift register (RSR) 2 which is composed of two flip-flops FF and the receiving shift register RSR 2 carries out a series of shifting operations in synchronization with the clock signal $C_1$. By utilizing the output signals $F_1$ and $F_2$ from FFs of the RSR 2, the rising edge of the command pulses E are latched. At the timing of the clock signal $C_2$, positive direction command pulses A and reverse direction command pulses B are produced by using gate circuits $G_1$, $G_2$, $G_3$ and $G_4$ depending upon the level of a direction signal L. As to feed back signals, A-phase signals F are received by an RSR 3 composed of two series-connected FFs in a manner similar to that of the RSR 2 for receiving the command pulse E. The rising edge and the falling edge of A-phase signals F (in the case of the low level of the B-phase signals G) are detected on the basis of level of the outputs 3a and 3b of two FFs of the RSR 3, and positive direction detecting pulses C and reverse direction detecting pulses D are produced by the use of gate circuits $G_5$ to $G_{10}$.

In FIG. 1, the rising edge corresponds to the positive direction detecting pulse C and the falling edge corresponds to the reverse direction detecting pulse D. However, the shifting operation of the RSR 3 is carried out by the clock signal $C_2$ and the output timing of pulses C and D is controlled by the clock signal $C_1$. As a result, the timing of the positive and the reverse direction command pulses A and B can be completely separated from that of the positive and the reverse direction detecting pulses C and D, so that the processing of the signal in a feedback circuit 4 can be easily carried out. The signals A, B, C and D are applied to the feedback circuit 4 having a positional deviation counter and driving polarity judging circuit 41, a D/A converter 42 and a driving circuit 43 and a motor M including the detector (i.e. rotary encoder).

There are many circuits which can be used as the feedback circuit 4. However, the particular construction of the feedback circuit 4 is not an important feature of the present invention, so that the detailed description of the feedback circuit 4 will be omitted. The signals to be applied to the feedback circuit 4 are the signals A, B, C and D and a reset signal J for initially setting the feedback circuit 4.

The positive and the reverse direction detecting signals C and D correspond to the rising edge and the falling edge of the A-phase signal F, respectively, when the B-phase signal G is in the low state. However, it is possible to obtain the positive and the reverse direction detecting signals in accordance with the falling edge and the rising edge of the A-phase signal F, respectively when the B-phase signal G is in the high state in accordance with the rising edge and the falling edge, or of the B-phase signal in a similar way. As mentioned above, it is well known that the positive and the reverse direction detecting signals can be obtained by combining these signals.

In the positioning of the digital servo device arranged as described above, a circuit shown in FIG. 3 is generally used as an outer control device, and a FF 10 for determining a predetermined position is set by the output 9a of a start switch 9 for positioning. Thus, a positioning command pulse generator 11 is operated so that the command pulses E are continuously produced.

When the mechanical device (e.g., industrial robot) is rendered to operate and rough positioning detector 14 produces a rough or coarse positioning signal 14a, an AND operation is carried out between the signal 14a and the positioning command 10a and then a command signal I for positioning the controlled object at the predetermined position is output through a buffer 16. The command signal I is continued to be produced until the digital servo device detects that the positioning is terminated and the positioning FF 10 is reset by a positioning command reset signal H.

In accordance with the above-described positioning operation in the outer controlling device, the predetermined point is detected by applying the command signal I, the Z-phase signal K of the detector and an edge signal M due to the change of the B-phase signal to an AND circuit 7 which produces an output reset signal J to carry out the initial set operation of the feedback circuit 4. At the same time, a position detecting signal H is output and applied to the outer controlling device as the positioning operation is terminated.

Since the friction torque in the mechanism varies, it is virtually impossible to provide a fixed time relationship between the command pulse and the detected output. Therefore, as shown in the timing chart of FIG. 4, at the same time the reset signal J for resetting the feedback circuit in response to the detection of the positioned condition and the positioning command reset signal H are output, there is the possibility of the occurrence of the command pulses E. In this case, the feedback circuit 4 has two possible conditions. One is the condition that the mechanical position obtained by the reset can be kept and another is the condition that the mechanical position is changed one or more pulses due to the command pulse. Either condition is selected in accordance with the critical timing. Therefore, it is very difficult to increase the reproducibility of the accuracy of the positioning. Moreover, generally speaking, in such an apparatus for a digital servo device, most positioning operations are performed as a part of a sequence of operations. More particularly, more than two target positions are provided, so that it is impossible to determine the circuit for generating the positioning command pulse at a critical timing applicable to each target position. Therefore, such a circuit is sometimes included in the outer controlling device in which the sequence is variable so as to be adaptable to various conditions. In such a case, the outer controlling circuit is provided so as to be separate from the digital servo control device, so that the buffers designated by references 16 to 21 in FIG. 3 are needed for eliminating the effect due to the noise. Due to these buffers, the time delay of the signal is increased, and the possibility of receiving the command pulse after the positioning is also increased. Therefore, the positioning error will tend to occur and a complex technique is required to solve this problem.

Figure 1:
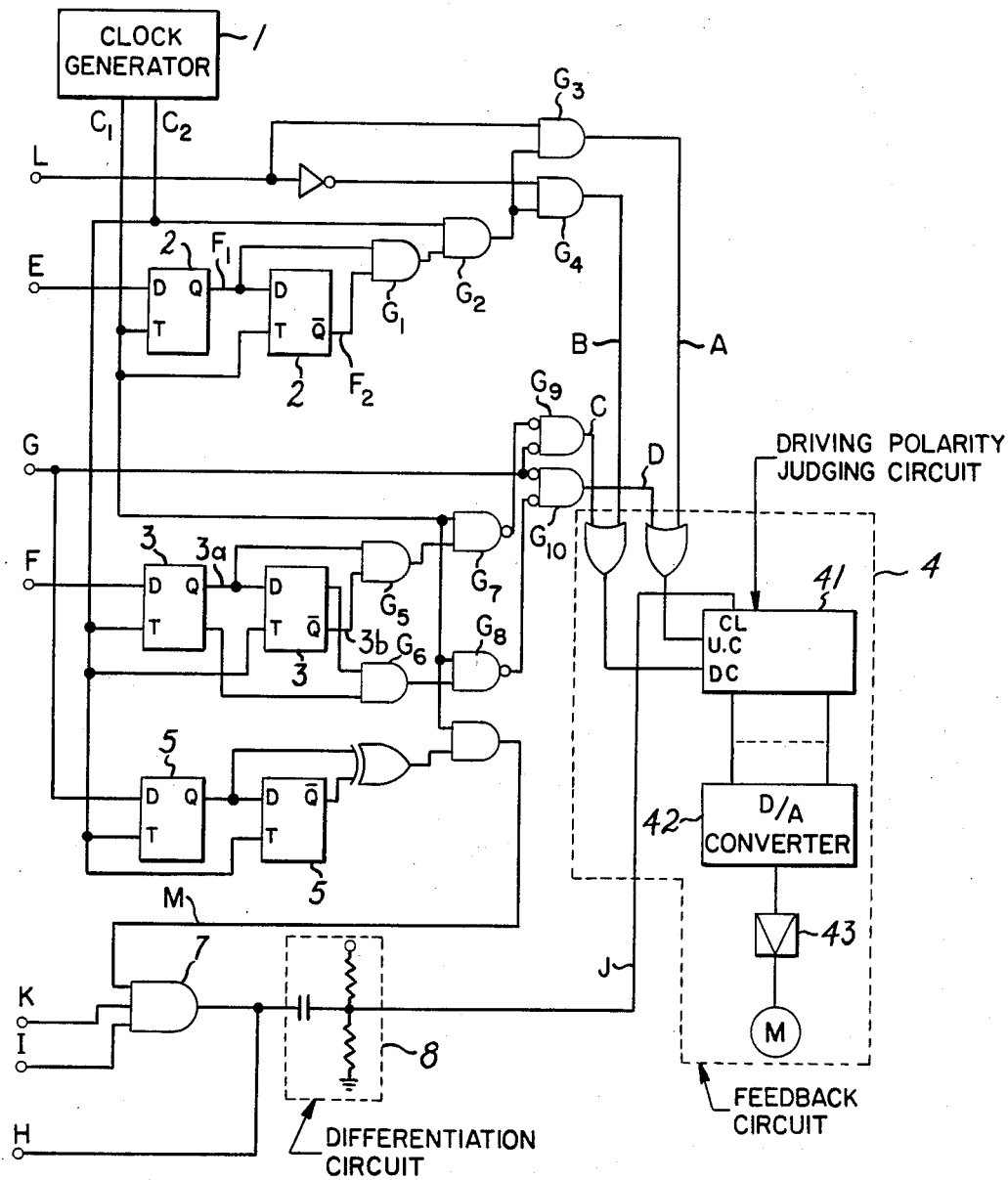
FIG. 1 is a schematic diagram of an example of a conventional digital servo device.
Figure 2:
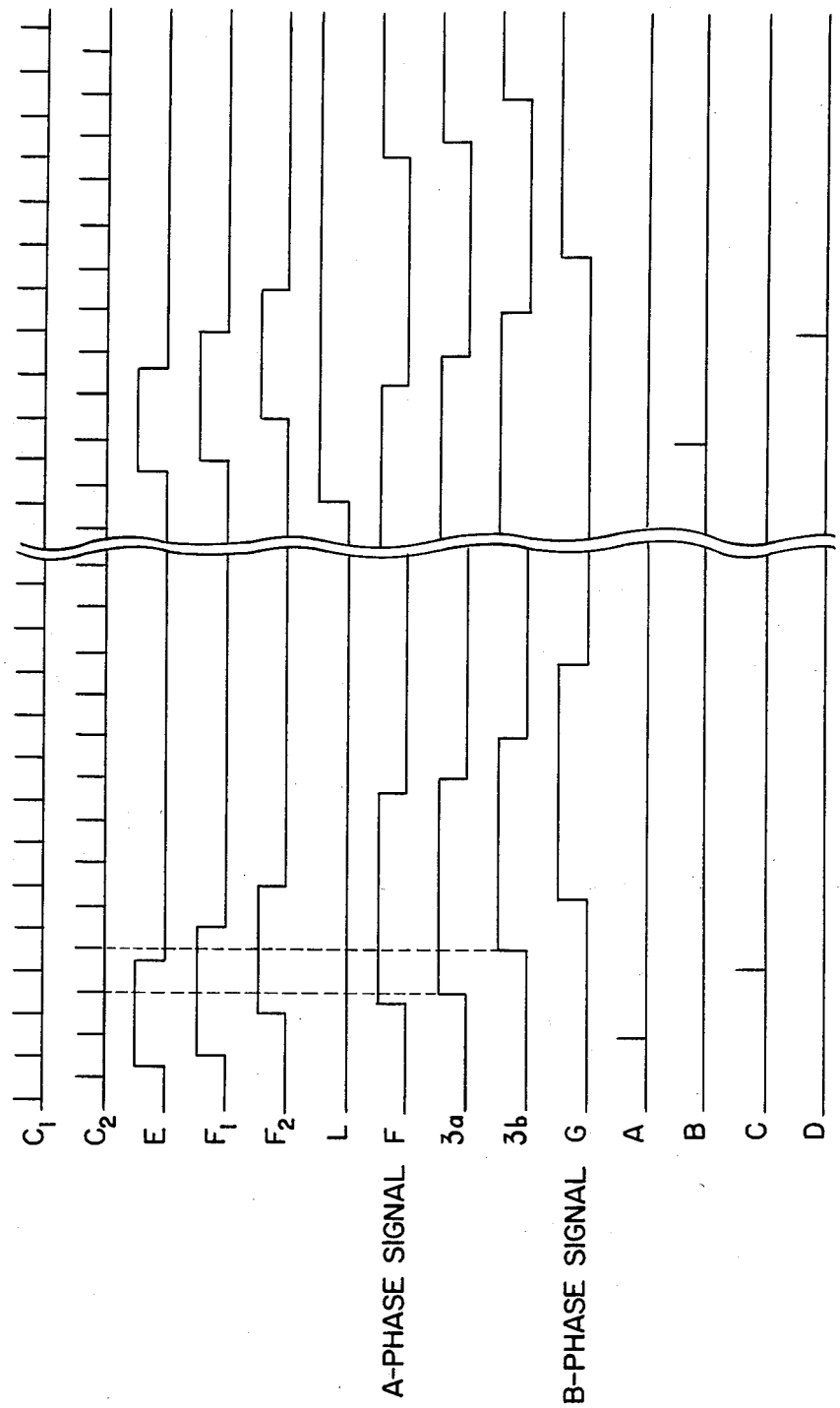
FIG. 2 is a timing chart showing the operation of the interface section of the device of FIG. 1.
Figure 5:
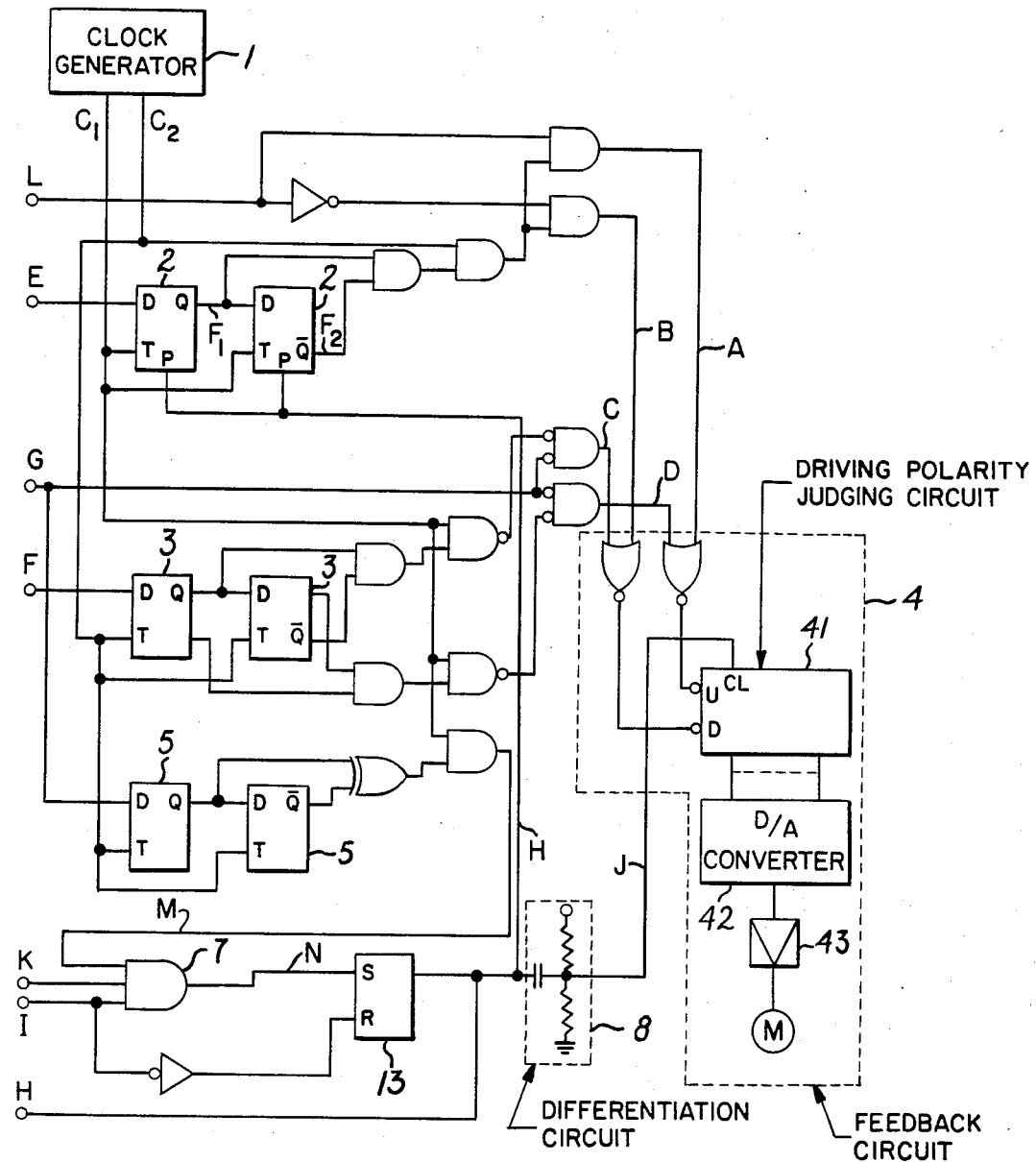
FIG. 5 is a block diagram of an embodiment of the system for positioning an object at a predetermined point of the present invention.
Figure 6:
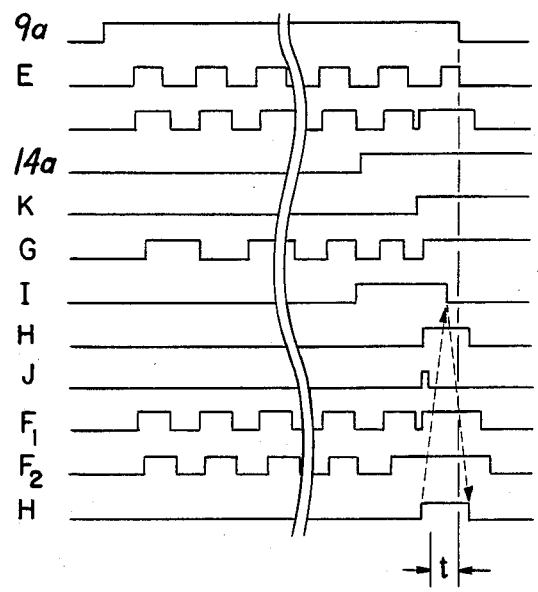
FIG. 6 is a timing chart for illustrating the positioning operation of the device shown in FIG. 5.

The present invention has been devised to eliminate the drawbacks mentioned above of the conventional system for positioning at a predetermined point and the present invention will be described in conjunction with FIG. 5 showing an embodiment of the present invention and FIG. 6 showing a timing chart for the positioning operation of the device shown in FIG. 5. The device shown by FIG. 5 is different from that of FIG. 1 in that a position detecting FF 13 is set in response to a predetermined point detecting signal N output from the AND circuit 7, the RSR 2 for transmitting the command pulses E is forcibly set by the output signal H from the FF 13, the output signal from the FF 13 is used as a positioning command reset signal H, and the feedback circuit 4 is reset by the differentiated signal J of the output signal H of the FF 13.

There are two ways for locking the RSR 2 by the position detecting FF 13. One is the way in which the RSR 2 is placed in the set condition as shown in FIG. 5. Another is the way in which the RSR 2 is placed in the reset condition. However, the former technique is superior to the latter. The reason is as follows: Since the receiving of the command pulses E at an interface circuit is carried out at the time of the rising edge of the pulses to the high level, in the circuit combining the circuits of FIG. 5 and FIG. 3, the following sequence is carried out:

FF13 set→FF10 reset→FF13 reset.

Figure 3:
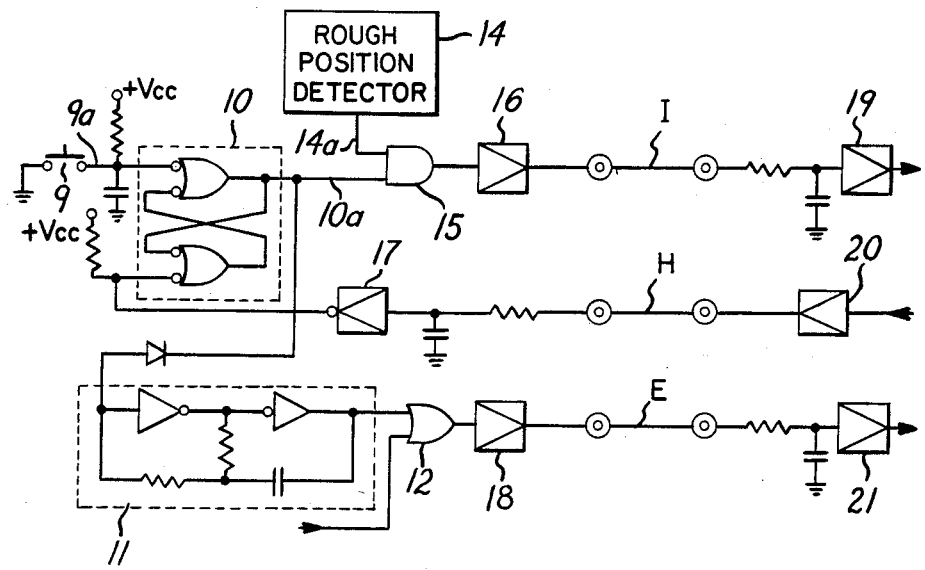
FIG. 3 is a schematic diagram of an outer positioning command circuit of the device of FIG. 1.
Figure 4:
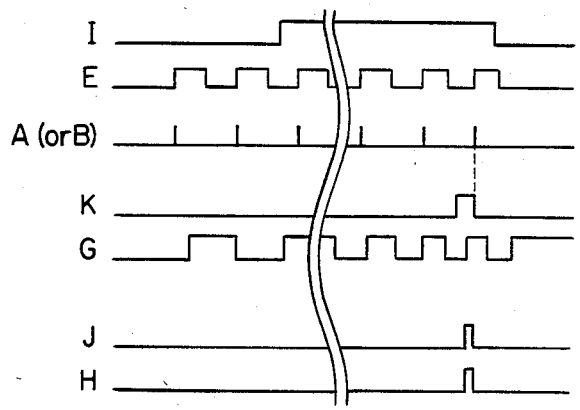
FIG. 4 is a timing chart for illustrating the positioning operation of the device shown in FIG. 1.

As shown in the circuit diagram of FIG. 3, when the command pulses E are extinguished in response to the reset of the FF10, the high level of the command pulse E sometimes remains due to the scattering of the signal transmission speed when the FF13 is reset. Therefore, since sometimes a signal is applied to the RSR 2 just after the reset locking state is canceled, it follows that the positive and the reverse direction command pulses A or B are produced. As a result, there is the possibility of putting out of order of the reset state to be maintained, so that it is necessary to add the sequence for resetting the FF13 after the time required for fully extinguishing the command pulse E in the outer device has passed. This makes the sequence to be complex. When the locking of the RSR 2 is a set locking (as opposed to a reset locking), the positive and the reverse direction command pulses are never produced as shown in FIG. 6, even if the command pulse E falls to the low level after the release of the set locking.

For these reasons, even when the simple outer positioning command circuit shown in FIG. 3 is used, the possibility of putting out of order of the maintaining state is zero. Therefore, no trouble will occur even if the reset operation of the position detecting FF13 is simply carried out by the reversed signal of the positioning command signal I.

As described above, since the positioning state is surely maintained by the system for positioning at a predetermined point according to the present invention, it is possible to eliminate the positioning error in the servo controlling operation of the controlling device. This technical effect is remarkable and unique.

We claim:

1. A system for positioning an object at a predetermined point in a digital servo device which has a mechanical driving device, a detector for producing an A-phase signal and a B-phase which are different in phase timing to each other and which are used for detecting the amount of the operation of the driving device and for producing a Z-phase signal for detecting the origin of said detector itself, a feedback circuit, and an interface circuit, said interface circuit having a clock generator for generating two clock signals whose timings at active levels are not coincident with each other, a receiving shift-register for receiving operating command pulses in synchronization with the clock signals, a first gate circuit for producing a positive and a reverse direction command pulses A and B on the basis of both the output from the receiving shift-register and an operating direction command signal at the rising edge of the level of one operating command pulse, a pair of receiving shift-registers for receiving the A-phase signal and the B-phase signal from the detector in synchronization with the clock signals, a second gate circuit for producing a positive and a reverse direction detecting pulses C and D on the basis of the outputs from the pair of receiving shift-registers, and an AND circuit for carrying out an AND operation among the outputs from one of said pair of receiving shift-registers, the Z-phase signal and a command signal for positioning an object at a predetermined point whereby the AND circuit produces as an output a predetermined point detecting signal, the improvement comprising: a position detecting flip-flop connect to be set by said predetermined point detecting signal, the flip-flop being connected such that the positive and the reverse direction command pulses A and B are inhibited from being produced by locking the first-mentioned receiving shift-register in response to the output from the flip-flop and the feedback circuit is reset by a reset signal having a pulse width which is wide enough for obtaining a resetting condition at the start of resetting but not so wide that the next positive and reverse direction detecting pulses C and D are extinguished.

2. A system as claimed in claim 1, in which the locking operation for the receiving shift-register is carried out when said receiving shift-register is in its set condition.

3. A system as claimed in claim 1, in which the position detecting flip-flop is reset by the reverse signal of the command signal.

* * * * *